Aug. 12, 1952 F. D. LESLIE ET AL 2,606,477

APPARATUS FOR THE PROJECTION OF PICTURES IN BLACK AND WHITE OR IN COLOR

Filed May 7, 1949 2 SHEETS--SHEET 1

INVENTORS.

RALPH D. WHITMORE
FRED D. LESLIE and
HERBERT E. BRAGG

BY

Albert M. Parker

ATTORNEY.

INVENTORS.
RALPH D. WHITMORE,
FRED D. LESLIE and
HERBERT E. BRAGG
BY
Albert M. Parker
ATTORNEY.

Patented Aug. 12, 1952 2,606,477

UNITED STATES PATENT OFFICE 2,606,477

APPARATUS FOR THE PROJECTION OF PICTURES IN BLACK AND WHITE OR IN COLOR

Fred D. Leslie, Malverne, and Ralph D. Whitmore, New York, N. Y., and Herbert E. Bragg, Oxford, N. J., assignors to Twentieth Century Fox Film Corporation, New York, N. Y., a corporation of New York Application May 7, 1949, Serial No. 92,048

8 Claims. (Cl. 88—16.4)

This invention relates to motion picture apparatus and, more particularly, to means for facilitating the alternate projection of pictures in black and white, or in color through an additive color system.

In optical projection, particularly that of motion pictures, it is often desired to switch from the projection of pictures in color to those in black and white, and vice versa.

In subtractive color processes no change in the light level is necessary in changing over the projection from black and white to color, or vice versa. Processes of the additive type, however, requiring filters when pictures are to be projected in color, call for increasing the light level when filters are used, and reducing the light level when the filters are removed for black and white projection. Previous proposals for effecting this change have involved expensive changes in equipment and somewhat detailed operation. Accordingly, little has heretofore been done in this field.

The principal object of the invention is to provide for the quick and accurate adaptation of projection apparatus from the projection of pictures in black and white to those in additive color, or vice versa.

Another object of the invention is to provide for such adaptation in respect to existing equipment without materially altering the same.

Still another object is to provide for such adaptation by simple quick operations, which can be accurately performed in a fool-proof manner with little effort on the part of the operator.

A specific object is to provide for the rapid and accurate replacement of the filters necessary, in an additive color system, for the projection of pictures in color, by an element modifying the light beam for projection of pictures in black and white.

A more specific object is to include in such replacement, provision for maintaining a positive relationship between the projector lens and the color filter.

In the illustrative embodiment of the invention shown in the accompanying drawing:

Figure 1 is a side elevation of a fragment of a projector housing with the side wall thereof broken away to expose the interior construction, and showing the application of the adapter construction of the invention to a projector. The adapter device is here shown in solid lines in one operative position and in dot-dash lines as reversed in the other operative position.

Figure 2 is a view taken on the line 2—2 of

Figures 1, 2, 3:
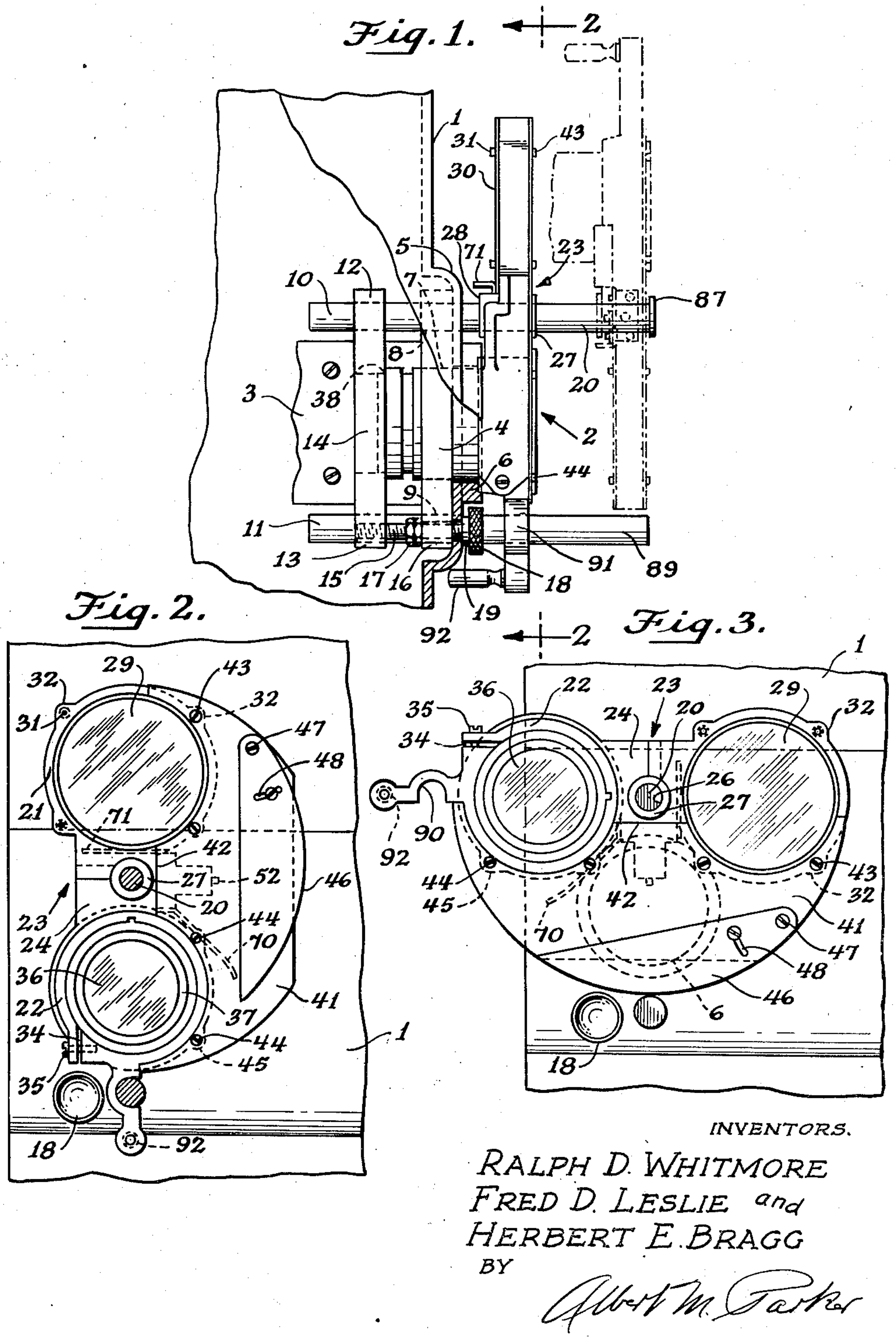

Figure 1 and looking in the direction of the arrows.

Figure 3 is a view similar to Figure 2 showing the adapter device turned at a 90° angle from the position it occupies in Figure 2.

Figures 4, 5, 6, 7, 8, 9, 10, 11, 12:
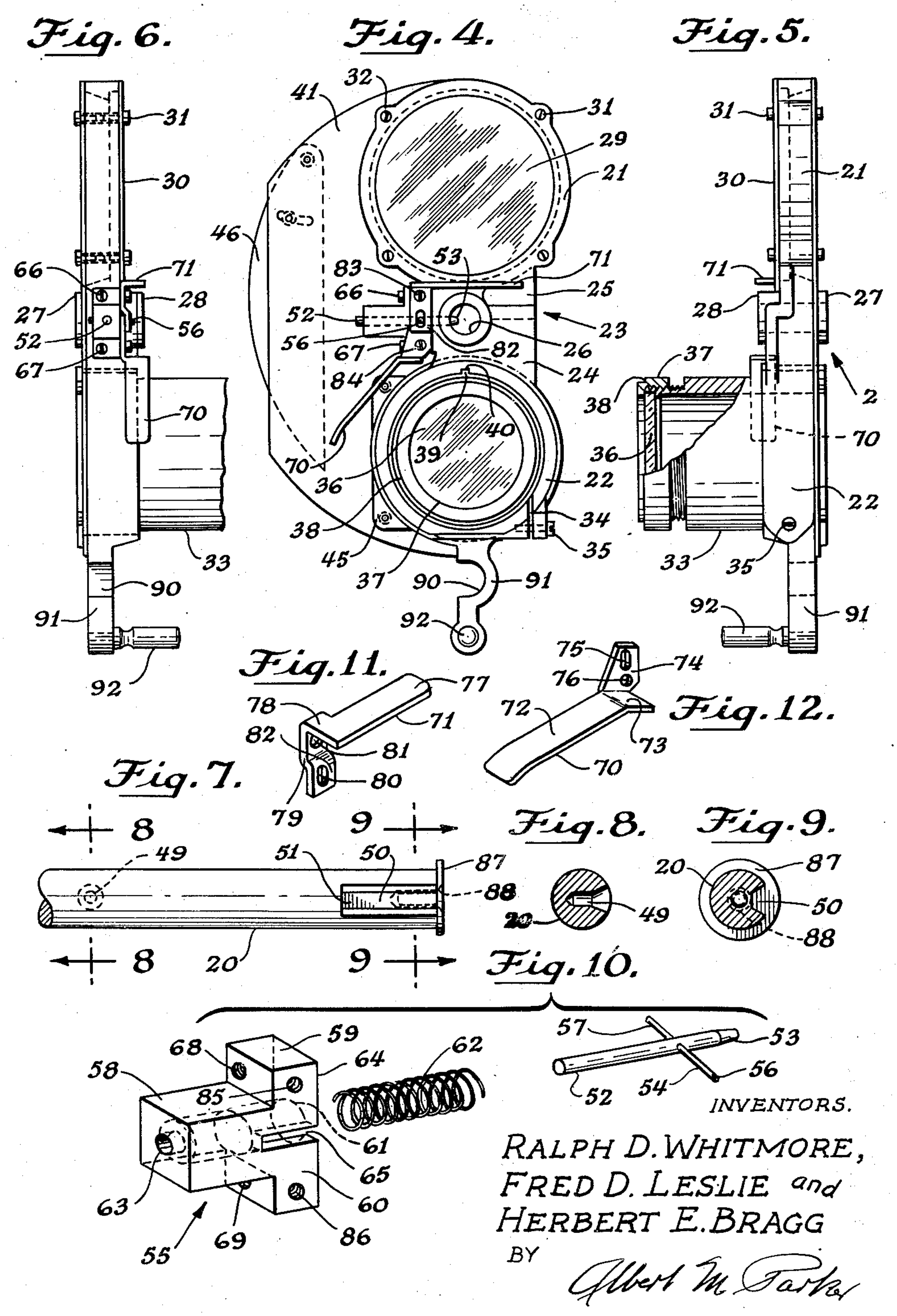

Figure 4 is an elevation on a somewhat larger scale of the adapter device per se looking at the reverse face of it from that shown in Figure 2.

Figure 5 is a side elevation of the Figure 4 showing as viewed from the right hand side thereof.

Figure 6 is a side elevation of the Figure 4 showing, viewed from the left hand side thereof, but with a fragment broken away.

Figure 7 is a fragmentary elevation of the special mounting rod of the invention construction.

Figure 8 is a section on line 8—8 of Figure 7 looking in the direction of the arrows.

Figure 9 is a section on line 9—9 of Figure 7 looking in the direction of the arrows.

Figure 10 is an exploded perspective view of the latch mechanism of the invention.

Figures 11 and 12 are perspective views of the latch levers for operating the latch mechanism.

In Figure 1 there is shown so much of the construction of a motion picture projector as is necessary to illustrate the addition thereto of the adapter construction of this invention. Such adapter construction consists principally of a rapid black and white color adapter, and a suitable mounting therefor. The fragment of a projector housing is shown generally at 1, and the adapter per se is shown generally at 2. The projector housing 1 is provided with a base or plate 3 which is suitably secured in place therein. At the right end of the fixed base 3, as viewed in Figure 1, the same provides a fixed collar 4. The collar 4 is seated in a recess portion 5 of the housing 1. The projection opening passes through the recess portion 5 and through the ring 6 which extends outwardly from the portion 5 and borders the opening. The collar 4 is centrally apertured at 7 with an aperture at least the size of the aperture in the ring 6 and is provided at its top and bottom with suitable guideways at 8 and 9 for the slidable reception of a pair of rods 10 and 11. These rods extend outwardly through the wall of the housing, and inwardly for reception in other suitable guideways in order to assure that they remain in accurate alignment without tilt, sideplay, or other undesirable movement, while they are being slid endwise, or during movement of the adapter engaged with them.

The rods 10 and 11 are, however, fixedly secured in place in the extending portions 12 and 13 of the lens tube clamping ring 14. This securing of the rods aids in the accurate alignment and relationship of them. The principal portion of the ring 14 clamps on to the forward end of the lens tube and serves for such focusing of the projection lens as may be necessary. Focusing is effected by employing some suitable means, such as the screw 15, threadedly received in the body of the ring 14, and projecting freely through an extending portion of the ring 4, as shown at 16. The screw 15 is secured against endwise movement by means of lock nuts 17 acting against the inner face of the ring 4, and by a knurled turning knob 18 whose collar 19 acts against the outside of the portion 5 of the projector housing just below the ring 6. The knob 18 is, of course, fixed to the outer end of the screw 15. Thus, when it is desired to focus the lens the knob 18 is turned to move the ring 14 to the right or left, as viewed in Figure 1. Inasmuch as the rods 10 and 11 are fixed with respect to the ring 14, and are otherwise free to slide, any movement of the ring 14 will cause a corresponding axial movement of the rods 10 and 11. To assure that proper focus is maintained when effected the guideway 8 may be formed in the shape of a U and be provided with a clamping screw to close the sides of the U against the rod 10.

The adapter 2 is pivotally mounted at about the center of its vertical height, on the portion 20 of the rod 10, extending out beyond the front face of the projector 1. The base frame of the adapter is substantially in the form of a figure eight, having a ring 21 at one extremity thereof, and a ring 22 at the other extremity thereof. These rings are joined by means of a center web, generally indicated at 23, whose lower portion 24 is thicker than its upper portion 25, since the portion 24 extends from the ring 22, which is thicker than the ring 21 from which the portion 25 extends. The web 23 is provided with a pivotal bore 26 whose axis is parallel to those of the rings 21 and 22 and whose extent is greater than the thickness of the web 23. This additional extent of the bore 26 is provided by the bosses 27 and 28 at each end of the bore, the purpose being to elongate the bore and increase its contact with the portion 20 of the rod which it receives in close pivotal contact. This extended contact reduces play between the rod portion 20 and the adapter, particularly that which might allow a tilting of the adapter on its mounting rod.

The ring 21 carries a neutral density filter 29 which is held in place by some suitable securing means such as the clamping plate 30. The plate 30 is in turn retained in position by means of the four clamping screws 31, secured in spaced projecting ears 32 which extend outwardly from the ring 21 for receiving them. These screws only penetrate the ears for a short distance in order to enable other screws to be coaxially inserted into the ears from the other side thereof.

The ring 22 is wider than the ring 21 and is split at 34 so that it may be opened sufficiently for the insertion of the outer end of the color filter tube 33. When the color filter tube is fully and accurately seated in place the split may then be drawn up by means of the clamping screw 35. As already pointed out, the width of the ring 22, as can be readily seen from Figures 1, 5 and 6, is substantial, and accordingly enables an effective gripping of the tube 33. This is important, for accurate alignment of the color filter tube with the lens tube and, more specifically, of the filters with respect to the lens, is essential in order to assure that the color will be correct. This mechanism is designed to provide the desired accuracy.

The color filter 36 carried by the filter tube 33 consists of color bands which must be properly oriented. That is, for proper operation the bands should, in the present instance, extend horizontally and that direction of extent should be carefully maintained. First, the filter 36 is clamped in proper position with respect to the tube 33 by means of a suitable clamping ring 37. This ring is provided with a recessed shoulder portion 38 around its free end for a purpose which will appear hereinafter. Next, with the filter 36 properly oriented with respect to the tube 33, the tube 33 is oriented with respect to its ring 22 by providing the tube 33 with a pin 39 and forming a receiving slot 40 for the same in the ring 22. This arrangement is such that when the color filter tube 33 is in operative position, as indicated in Figure 1, the color bands will be oriented horizontally. Furthermore, accurate alignment of the filter tube with respect to the lens tube must be so maintained. This alignment is known to be effected when the shoulder portion 38 around the wing 37 seats against and slightly within the free end of the lens tube as they are brought together.

Besides the neutral density filter and the color filter, the adapter also includes a masking plate 41, which in effect completes a half circle developed from a vertical line drawn through the adapter and passing through the center of the bore 26. This plate is recessed at its inner edge to encompass the adjacent portions of the ring members 21 and 22, and has an intermediate section to lie against one edge 42 of the center web 23. The plate 41 is secured in place by some suitable means, such as the screws 43, extending through it into the remaining portions of the bores of the ears 32 and by another pair of screws 44 extending through the plate into ears 45 provided on the ring 22.

The particular masking plate here shown has its semi-circular form completed by means of a retractable masking blade 46. This blade is pivoted at 47 to the plate 41 and has a controlled swinging movement with respect to the plate through the pin and slot arrangement shown at 48. In its downward position, as indicated in Figure 3, the blade 46 complements the plate 41 and completes the half circle just mentioned, so that a full masking of the projection aperture through the ring 6 is provided where needed in the movement of the adapter from one extreme position to the other. The blade 46 is mounted to retract so that the masking plate can pass by obstructions such as the bracket holding the shutter housing. In one form of well known projection apparatus such brackets would be in the way.

From the foregoing description and from the showing in the drawing, it will be appreciated that the adapter 2 is designed to be employed in two extreme positions. One is shown in solid lines in Figure 1, where the color filter tube 33 extends within the projector housing and locates the filters in proper position with respect to the customary projector lens. The other position is that in which the adapter is slid outwardly on the rod 20 and is swung through an angle of 180° to move the color filter tube 33 up out of the way and place the neutral density filter 29 across the path of the projected light beam. The presence of the neutral density filter 29 in this position will serve to reduce the light level to the extent desired for black and white projection.

Cooperating elements are provided on the adapter and on its mounting to assure accurate positioning of the adapter in its two operative locations. The elements provided by the mounting consist of recesses 49 and 50 in the rod portion 20 at 180° arcuate distance away from each other. The recess 49 is conical and is formed in the rod adjacent the position where the same extends through the end wall 5 of the projector housing. The other recess 50 is, as shown, in the form of a groove formed in the rod portion 20 at the extreme end thereof. The groove 50 may, if desired, have an inclined entrant portion 51.

The adapter is equipped with a latch mechanism having an element for selectively engaging either the recess 49, or the groove 50, to positively locate the adapter in place in the desired one of its operative positions. This mechanism includes a pin 52 whose nose 53 extends through the wall of the bore 26, and is formed as a section of a cone to enable it to find its way into the outwardly inclined opening of the recesses 49 and 50. The pin 52 is provided, adjacent its nose 53, with a cross-pin 54 for guiding and actuating it in the mounting block 55 of the latch mechanism. Preferably, one arm 56 of the cross-pin 54 is longer than the other arm 57, since the arm 56 not only serves as a guide but is also engaged by the latch actuating levers.

The block 55 is generally T-shaped with a base 58 and a pair of wings 59 and 60. The block is bored throughout the majority of its length, as shown at 61, in order to receive a spring 62 which overlies the body of the pin 52 and acts between the base of the bore and the cross-pin 54. The bore 61 terminates in a reduced axial portion 63, of a size to slidably receive the end of the pin 52 remote from the nose 53. The bore 61 is also opened up for a distance inward from the top face 64 of the block into side opening guide slots 65, which slidably receive the portions 56 and 57 of the cross-pin 54. Thus, by the guiding action of the reduced bore 63 and of the slots 65, accurate to and fro movement of the pin 52 is assured. The block 55 is secured to the face 42 of the web 23 by some suitable means such as screws 66 and 67 extending through openings 68 and 69 in the wings 59 and 60.

The pin 52 is actuated by a pair of latch levers 70 and 71 (Figures 11 and 12), which, when mounted in operative position, extend towards opposite sides of the projector, so that a lever will be present to actuate it from the operator's side of the machine, whether the adapter be in one operative position or its reverse. The latch lever 70 has an elongated lever arm 72 which, as shown in Figure 4, extends at approximately a 45° angle downwardly with respect to the horizontal, so as to be in unobtrusive but readily available position. At its upper end, the lever terminates in a normally horizontally extending portion 73 whose inner edge is provided with an upwardly extending wing 74. The wing 74 is pierced with an elongated actuating slot 75 and a securing opening 76. The lever 71 has a short lever arm 77 and has a laterally extending ledge 78 at its inner end. A wing 79 extends downwardly from the outer edge of the ledge 78 and provides an elongated actuating slot 80 and a securing opening 81. The portion 82 of the wing 79 which includes the slot 80 is offset inwardly with respect to the commencing portion of the wing. This offset is substantially the thickness of the wing 74 of the lever 70, so that the portion of the wing 74, including the slot 75, may be received therein.

The mounting of the actuating levers 70 and 71 on the block 55 is shown in Figure 4, and is achieved by some means such as the screws 83 and 84. These screws extend respectively through the perforations 81 and 76 with sufficient freedom to serve as pivot pins for the levers. The screws are engaged with suitable bores 85 and 86. When the levers are so mounted in place, the wing portion 82 will overlap the portion of the wing 74 carrying the actuating slot 75. Thus, in the relaxed position of the mechanism, the slots 75 and 80 will be substantially aligned and will receive the extending portion 56 of the cross-pin 54 therethrough. Accordingly, when one of the lever arms is moved downwardly, as viewed in Figure 4, it will pivot about its mounting on the appropriate one of the screws 83 and 84, will act, through its slots 75 or 80, on the cross-pin 54, and will retract the pin 52 against the action of the spring 62. On proper retraction of the pin 52 the adapter will be freed to be turned and slid with respect to the rod portion 20. As soon as the adapter reaches its desired location, the nose 53 of the pin will, through the action of the spring 62, seat in the desired one of the apertures 49 or the slots 50. To prevent the adapter from sliding off the end of the rod portion 20, that end is provided with a plate or other suitable element 87. The element 87 is secured in place by means of the screw 88.

The rod 11, like the rod 10, has a portion 89 extending out through the front face of the projector housing. In the color projecting position of the adapter, the portion 89 is engaged by a recess 90 in an arm 91, which extends downwardly from the bottom of the adapter. This arm is also provided, at its lower end, with a laterally extending actuating handle 92. The recess 90 engages with the rod 89 when the adapter is in true vertical position, as does the nose 53 with the recess 49. Together they doubly assure exact horizontal alignment of the elements of the color filter 36 when the adapter is in color projecting position.

The mechanism of the invention also provides for the color filters, when being in operative position, remaining in proper spaced relationship with respect to the lens in the lens tube. When any focusing of the lens is desired, it is first necessary to relax any clamping action provided by the use of a clamping screw across the guideway 8 and then turn the focusing screw 18 to move the lens tube clamping ring 14 either to the right, or left, as viewed in Figure 1. The rods 10 and 11 being held by the extensions 12 and 13 of the ring 14, are slid in the same direction as the ring 14, and are moved the same distance as it is moved. Thus, with the nose 53 in engagement with the recess 49, the adapter 2 must be moved the same distance as the rods are moved. The color filter elements are thus moved in the same direction as the lens and the same distance. Proper color definition once established will accordingly be maintained.

No such accuracy is required when the neutral density filter replaces the color filters across the projected beam. The principal criterion here is that the neutral density filter be properly aligned with the beam. This is achieved by the interlocking of the nose 53 with the slot 50.

From the foregoing it is believed to be apparent that accurate adaptation of a projector for the projection of color pictures of the additive type, or, alternately, for those in black and white, is readily achieved by the construction of this invention. In operating the adapter all that the operator needs to do is to grasp the handle 92 and actuate whichever of the lever arms 70 or 71 happens to be before him. Assuming the adapter to be in the solid line position of Figure 1, and the operator wants to change from the projection of pictures in color to those in black and white, he depresses the lever 71 and withdraws the nose 53 of the pin 52 from the recess 49. He then slides the adapter to the right until the color filter tube is fully withdrawn from the projector housing, which condition will exist just before the boss 27 comes into engagement with the plate 87. Next he raises the handle 92 upwardly until the adapter has been turned 180° on its rod portion 20. This position will be automatically determined by the nose 53 seating itself in the slot 50.

The reverse actuation of the adapter is just as easy. First the nose 53 is freed from the slot 50 by depressing the lever 70 which is readily available in this position. Then the adapter is turned back 180° to engage the recess 90 with the rod portion 89. This will establish the initial and normally accurate alignment of the color filter tube with the projection aperture and lens tube, so the adapter can be slid to the left until it again returns to the solid line position of Figure 1. Interlocking of the nose 53 with the recess 49 will take place automatically, through the action of the spring 62, to complete the accuracy of the positioning, both circumferentially and axially, with respect to the rod 20.

It is believed that changes could be made in the above construction and different embodiments of the invention could be made without, however, departing from the spirit, or scope, thereof. It is, accordingly, intended that all the matter contained in the above description, or shown in the accompanying drawing, shall be interpreted in an illustrative rather than in a limiting sense.

Having described our invention, what we claim as new and desire to secure by Letters Patent is:

1. In optical projection apparatus, in combination, a device for the projection of pictures by means of a light beam, a member for changing the optical characteristics of said projected beam and mounting means for mounting said member in operative relationship with respect to said light beam, said member including spaced light transmissive elements of different optical characteristics and a mounting element, said mounting means being carried by said projection device and extending therefrom parallel to the axis of said projected beam, said mounting element being pivotally and slidably mounted on said mounting means to selectively position one, or another of said light transmissive elements in operative position across said light beam, said mounting means being formed with longitudinally and angularly spaced locating elements and said mounting element being provided with retractable locating means to engage said locating elements on said mounting means and locate said member in the selected one of its operative positions with respect to said light beam.

2. In motion picture projection apparatus, the combination with a projector, of an adapter for quickly adapting from the projection of pictures in color of the additive type to those in black and white, and vice versa, which includes, a wall of the projector formed with a projection aperture therethrough, a mounting rod mounted on said projector and extending from said wall in parallel relationship to the axis of the projected light beam emanating from said aperture, a filter carrying frame pivotally mounted on said mounting rod, said frame including aligned substantially annular filter mounts and a connecting web therebetween, a pivotal mounting journal on said web for mounting said frame on said mounting rod, and a latch and catch mechanism mounted for operation between said frame and said rod for locating said frame in a plurality of operative positions with respect to the light beam projected from said aperture.

3. Apparatus as in claim 2 wherein one of said filter mounts is furnished with a neutral density filter and another of said mounts receives a color filter mounting barrel, said barrel extending a substantial distance laterally with respect to the general plane of said frame.

4. Apparatus as in claim 3 wherein said latch and catch mechanism includes a latch element mounted on said web and operable through said journal and said catch mechanism includes receiving depressions formed in said pivotal mounting rod, said depressions being angularly and longitudinally spaced on said rod, said longitudinal spacing being no less than the free extent of said color filter barrel beyond said frame.

5. In optical projection apparatus, a lens mount clamping ring, a mounting rod extending from said clamping ring and fixed with respect to the same, focusing mechanism for moving said clamping ring, a color filter device carried by said rod and interengaging means between said color filter device and said rod for assuring that focusing movement imparted to said lens mount clamping ring will also be imparted to said color filter device.

6. In a device of the character described, a frame including a pair of spaced mounting elements for mounting optical filters on axes parallel to each other, a connecting web extending between said spaced elements, said connecting web including a pivotal mounting journal for pivotally mounting said frame on a support, said pivotal mounting journal extending on an axis parallel to the axes of said filters, latch means mounted on said web, and a masking element filling the space between one side of said web and the adjacent portions of said mounting elements, said masking element extending outwardly from the axis of said journal on a radius substantially equal to the greatest extent of said frame away from said journal axis.

7. In a device of the character described, a frame including a pair of spaced filter mountings and a connecting web connecting said mountings together in spaced relation, one of said filter mountings being provided with a substantial flat filter and the other of said filter mountings being provided with a tubular filter holder extending laterally with respect to the plane of said filter mounting, means for clamping said filter and said tubular holder in their respective mountings and said web being formed with an elongated pivotal mounting journal therein, said journal, said filter, and said tube being located on parallel axes.

8. In a device of the character described, a mounting web, an elongated pivotal mounting journal forming part of said web, a pair of substantially annular housings mounted on said web with their axes parallel to the axis of said journal and in angularly spaced relation with respect to each other about the center formed by said journal axis, latch mechanism carried by said web, said latch mechanism including a latch pin extending through the wall of said journal and means to operate the same from different positions, and a masking plate extending from the extreme position of one of said annular housings to the other of said annular housings and extending away therefrom on a radius from the center of said journal substantially equal to the longer of said extreme positions, said masking plate including a retractable masking blade.

FRED D. LESLIE.
RALPH D. WHITMORE.
HERBERT E. BRAGG.

REFERENCES CITED

The following references are of record in the file of this patent:

UNITED STATES PATENTS

| Number | Name | Date |
|---|---|---|
| 1,188,612 | Blair | June 27, 1916 |
| 1,613,562 | Frost | Jan. 4, 1927 |
| 1,623,435 | O'Grady | Apr. 5, 1927 |
| 1,688,441 | Stewart | Oct. 23, 1928 |
| 1,723,701 | McNabb | Aug. 6, 1929 |
| 1,754,282 | Owen | Apr. 15, 1930 |
| 1,754,323 | Killick | Apr. 15, 1930 |
| 1,787,808 | Wittel | Jan. 6, 1931 |
| 1,830,121 | Merkel | Nov. 3, 1931 |
| 2,059,361 | Kenworthy | Nov. 3, 1936 |
| 2,315,284 | Thompson | Mar. 30, 1943 |
| 2,497,018 | Sherry | Feb. 7, 1950 |
| 2,503,714 | Eagle et al. | Apr. 11, 1950 |

FOREIGN PATENTS

| Number | Country | Date |
|---|---|---|
| 378,098 | Great Britain | Aug. 11, 1932 |
| 415,956 | Great Britain | Sept. 6, 1934 |
| 534,595 | Great Britain | Mar. 11, 1941 |